GAS-BLAST CIRCUIT INTERRUPTER WITH PURIFYING MEANS
Original Filed March 27, 1961
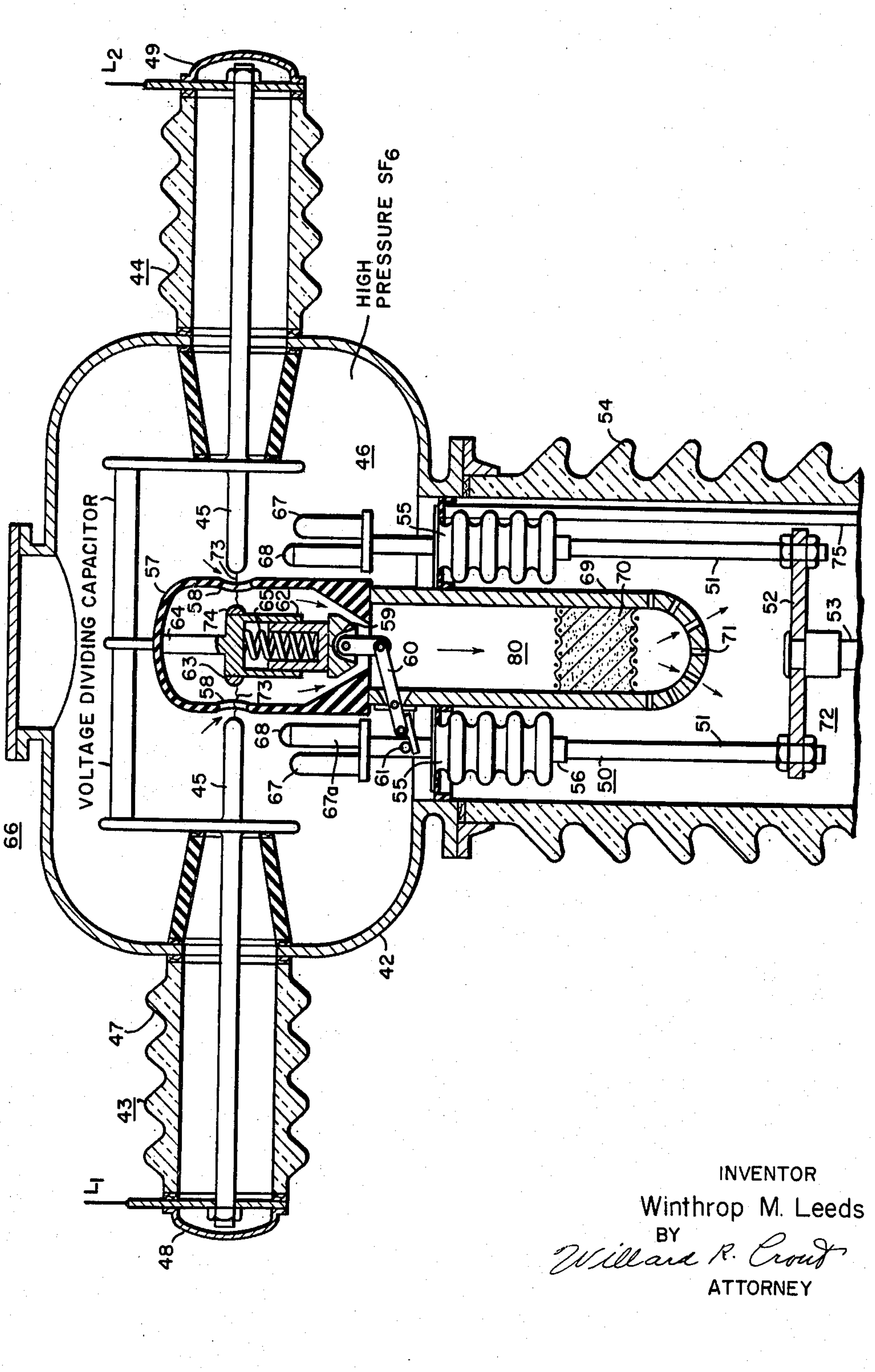
INVENTOR
Winthrop M. Leeds
BY
Willard R. Crout
ATTORNEY 3,214,552
Patented Oct. 26, 1965

3,214,552

GAS-BLAST CIRCUIT INTERRUPTER WITH PURIFYING MEANS

Winthrop M. Leeds, Forest Hills, Pa., assignor to Westinghouse Electric Corporation, Pittsburgh, Pa., a corporation of Pennsylvania Original application Mar. 27, 1961, Ser. No. 98,632. Divided and this application Feb. 7, 1964, Ser. No. 343,371
7 Claims. (Cl. 200—148)

This is a division of application Serial No. 98,632, filed March 27, 1961.

This invention relates generally to gas-blast circuit interrupters, and, more particularly, to filtering and purifying means for the arced gas which is used to effect interruption of the established arcing.

A general object of the present invention is to provide an improved compressed-gas circuit interrupter of the type employing as an arc-extinguishing medium a gas of relatively high dielectric strength and an efficient arc extinguisher, such as sulfur-hexafluoride ($SF_6$) gas, selenium-hexafluoride ($SeF_6$) gas, ($CF_3SF_5$), and other gases which may have active products of decomposition following their use as arc-extinguishing gases.

A more specific object of the present invention is to provide an improved compressed-gas circuit interrupter utilizing a substantially closed gaseous system in which the gas is repeatedly reused, and in which novel filtering means are provided to purify the gas prior to its subsequent ejection into the general interior of the circuit-breaker structure.

Power circuit breakers using $SF_6$ gas, for example, for insulation and arc interruping have been built in many forms: single-bushing types, live-tank types, dead-tank types, etc., all showing excellent performance possibilities. By proper choice of insulating materials, deterioration from the effects of active gas products of arcing has been avoided, with containers of activated alumina powder being provided to gradually purify the gas. Metallic fluoride powders are also formed by arcing at the contacts in $SF_6$, but there are insulating when dry and normally give no trouble.

Carbon particles from gases such as $CF_4$ and $C_3F_8$ should also be removed to prevent their deposit upon insulating surfaces.

However, maintenance of breakers may involve exposure of personnel to slightly toxic vapors, if breakers are opened immediately after heavy fault interruptions. Also, on humid days, the fluoride powders absorb moisture quickly, and very complete cleaning of all insulating surfaces becomes essential.

The present invention is intended to eliminate such maintenance difficulties by directing all arced gases into a metal chamber where no insulation stressed by voltage would be present. Then an activated alumina powder filter or a mesh filter is provided, through which the gas must flow before it can reach insulating surfaces. Thus, reactive vapors and powders are removed before the gas is returned to the rest of the breaker for reuse.

Since the integrity of the insulation to ground is of paramount importance, fairly inaccessible parts such as rods, tubing and porcelain surfaces in the supporting columns of the breaker are particularly important to protect from fluoride powder accumulation. This means that the screening action of the filter in taking out solid particles as its primary function. If purification of the gas is not complete in this filter just below the interrupter, additional purification will take place in the filter provided ahead of the compressor used to fill the high-pressure gas reservoir.

Effective interrupting action requires a high velocity gas flow through the downstream valve to low pressure. Excessive restriction of the flow passages, for instance by too much pressure drop in a large filter close to the valve, could build up undesirable back pressure. This situation is avoided by providing an expansion volume below the valve ahead of the filter and by limiting the filter function primary to a powder screening action with relatively small pressure drop.

Accordingly, it is a further object of the present invention to provide improved compressed-gas circuit-breaker structures, in which maintenance problems are reduced by collecting all of the arced gas following its use as an arc extinguisher, and immediately purifying, or filtering such arced gas prior to its subsequent release into the general interior of the breaker structure.

Further objects and advantages will readily become apparent upon reading the following specification, taken in conjunction with the drawing illustrating a vertical sectional view taken through a compressed-gas circuit interrupter, the contact structure being illustrated in the partially open-circuit position.

The figure, as illustrated, shows a type of circuit-interrupting structure embodying the principles of the present invention. It will be noted that there is provided a live metallic tank 42 filled with high-pressure gas, for example sulfur-hexafluoride ($SF_6$) gas at 150 p.s.i. Extending laterally through the live metallic high-pressure tank 42 is a pair of oppositely-disposed terminal bushings 43, 44, supporting relatively stationary contact posts 45 within the general interior 46 of the tank structure 42. The terminal bushings 43, 44 preferably comprise insulating weatherproof casings 47 and outer terminal cap portions 48, 49.

Cooperable with the inner ends of the relatively stationary contact posts 45 is a substantially U-shaped bridging structure, generally designated by the reference numeral 50, and comprising a pair of vertically-extending conducting operating rods 51, interconnected adjacent their lower ends by a conducting transverse bridging member 52. An insulating operating rod 53 extends interiorly of an upstanding supporting insulating column 54, and serves to effect upward closing and downward opening movement of the pair of conducting operating rods 51 in an obvious manner.

It is desirable to effect a sealed connection between the operating rod 51 and the wall of the live tank 42. For this purpose, preferably metallic bellows 55 are provided, being sealed, as by a brazed connection to the tank 42, and also being sealed, as by a brazed connection, to a plate 56, which, in turn, is affixed to the conducting operating rod 51 and movable therewith.

Disposed interiorly of the live tank structure 42 is a blast valve housing chamber 57 having a pair of orifice openings 58 associated therewith. A movable blast valve 59 has a pivotal linkage 60 engaged by a drive-pin 61, affixed to, and movable with, the left-hand conducting rod 51, as viewed in the figure. The blast valve 59 is guided by a moving guide 62 slidable within a guide housing 63 affixed by a pair of supports 64 to the blast valve housing 57. As shown, a compression spring 65 biases the guide 62, and consequently the blast valve 59 to the closed position.

In the closed-circuit position of the circuit interrupter 66, the electrical circuit passing therethrough generally includes line terminal connection 48, relatively stationary contact post 45, finger contacts 67, conducting operating rod 51, conducting transverse member 52, right-hand conducting operating rod 51, right-hand relatively movable contact finger 67, right-hand contact post 45, from whence the circuit extends through the right-hand terminal bushing 44 to the other terminal connection 49.

During the opening operation, suitable means, not shown, is operable to effect downward opening movement of the insulating operating rod 53. This will bring about corresponding downward opening movement of the transverse conducting member 52, and consequently the conducting operating rods 51, which are secured thereto.

The downward opening movement of the conducting operating rods 51 will effect separation between the movable contact fingers 67 and the inner extremities of the contact posts 45 to draw arcs therebetween. Preferably, one of the contact fingers **67*a* is made slightly longer than the other contact finger 67, and has an arc-resisting tip portion 68** associated therewith.

Simultaneously with the downward opening movement of the left-hand conducting operating rod 51, the drive-pin 61 associated therewith effects, through the linkage 60 upward opening movement of the blast valve 59 to permit a blast of gas to pass out of the valve housing 57 and into a metallic exhaust chamber 69. Filtering material, such as fine wire mesh and activated alumina 70 is preferably disposed within the exhaust cylinder 69, and this forces all of the exhaust gases to pass therethrough prior to subsequent passage through perforations 71 and into the general interior 72 within the upstanding insulating column 54. The sulfur-hexafluoride gas within the insulating column 54 is preferably at a pressure of substantially 30 p.s.i.

The opening of the blast valve 59, downstream of the orifice opening 58, will cause the radially inflowing blast of gas about the stationary contact post 45 to carry the arc 73 to an arcing-horn portion 74, which constitutes a portion of the guide cylinder 63. As shown in the figure, the two serially related arcs 73, extending through the orifice openings 58, are subjected to a radial inward blasting of gas, which passes downwardly within the valve housing 57 and is exhausted into the lower exhaust chamber 69. It will be observed that all of the arced gas is compelled to pass through the metallic exhaust chamber 69, and through the filtering material 70 prior to its subsequent reuse.

Suitable compressor means, not shown, are operable to extract the gas within the general interior 72 of the insulating column 54, which is substantially at 30 p.s.i., and to recompress this gas to the high-pressure value of 150 p.s.i., from whence it is fed from the compressor upwardly by way of the feed tube 75 from ground potential and back into the upper live tank 42 for subsequent reuse.

From the foregoing discription of the circuit interrupter 66, it will be apparent that all of the gas used during interruption of the arcs 73 will be compelled to pass through the filtering material 70 prior to its subsequent reuse.

From the foregoing, it will be apparent that in the circuit interrupter 66, illustrated in the drawing, that there is provided a novel construction with a high-pressure reservoir 42 at high potential, with terminal bushings 43, 44 at each side of the tank. Pulling open the contacts 67 operates a blast valve 59 on the exhaust side of the flow channels 58. The exhaust gases go through the filter 70 in the metal exhaust chamber 69 and finally into the supporting porcelain column 54. The low-pressure gas from the column 54 is recompressed and fed up an insulating pipe 75 to the high-potential high-pressure tank 42.

The volume 80 just below the blast valve 59 ahead of the filter 70 allows free flow and gas expansion for improved interrupting action, limiting the back-pressure build-up that would result from locating the filter 70 very close to the valve 59 without this expansion volume.

Although considerable laboratory data is available in regard to the reaction of $SF_6$, by reason of analogy, it is believed that the same contaminating problem is present with gases such as $SeF_6$, $CF_3SF_5$ and $SO_2F_2$.

The filters set forth in the above described circuit interrupter may be employed to remove carbon from certain gases, which give off carbon during circuit interruption. A few of such gases are $C_3F_8$, the Freon gases, such as Freon 12 and $CF_4$. For the purpose of removing carbon, glass wool, paper, such as blotting paper, may be employed. By reason of such filtering of the carbon-emitting gases, such gases will be in a condition for subsequent reuse without the deleterious effect of carbon being deposited upon insulating surfaces.

From the foregoing description, it will be apparent that the invention is particularly concerned with a gas-type of circuit interrupter comprising a closed gaseous system, wherein arced gas is collected and filtered, before being released to come into contact with high-voltage insulation.

Although there have been illustrated and described a specific interrupting structure, it is to be clearly understood that the same was merely for the purpose of illustration, and that changes and modifications will readily be made therein by those skilled in the art, without departing from the spirit and scope of the invention.

I claim as my invention:

1. The combination in a gas-blast circuit interrupter of a high-pressure chamber, said interrupter utilizing a gas which when exposed to arcing forms reactive products of decomposition at least momentarily, separable contact means disposed at least partially within said high-pressure chamber for establishing an arc within the high-pressure chamber, means defining a downstream blast valve at high potential separate from said contact means, the opening of said downstream blast valve causing a high-pressure flow of gas adjacent said arc and through the blast valve, a metallic filter exhaust chamber at high potential disposed downstream of said blast valve for filtering all of the arced gas flowing through the blast valve, means defining insulating surfaces subject to voltage potential on the exhaust side of said downstream blast valve and serving as a conduit for arced gas, and the metallic filter exhaust chamber containing a suitable filter material so as to effect immediate extraction of said reactive products from the arced gas prior to recirculation of the arced gas against said insulating surfaces.

2. A high-voltage compressed-gas circuit breaker including a live metallic tank filled with gas under pressure, said interrupter utilizing a gas which when exposed to arcing forms reactive products of decomposition at least momentarily, a supporting insulating column for supporting said live metallic tank an adequate distance above ground, said insulating column defining insulating surfaces subject to voltage potential on the exhaust side of said downstream blast valve and serving as a conduit for arced gas, and the metallic filter exhaust chamber containing a suitable filter material so as to effect immediate extraction of said reactive products from the arced gas prior to recirculation of the arced gas against said insulating surfaces, a pair of terminal bushings protruding into said live metallic tank and supporting relatively stationary contacts therein, movable bridging contact means for electrically bridging the pair of relatively stationary contacts in the closed-circuit position, orifice means associated with each relatively stationary contact, means defining a downstream blast valve which when opened will cause a blast of gas from within the live high-pressure tank through the pair of orifice means and through the downstream blast valve, and a metallic filter exhaust chamber disposed downstream of said blast valve for collecting substantially all of the arced gas and filtering the same prior to subsequent reuse.

3. A high-voltage compressed-gas circuit breaker including a live metallic tank filled with gas under pressure, a supporting insulating column for supporting said live metallic tank an adequate distance above ground, a pair of terminal bushings protruding into said live metallic tank and supporting relatively stationary contacts therein, movable bridging contact means for electrically bridging the pair of relatively stationary contacts in the closed circuit position, orifice means associated with each relatively stationary contact, means defining a downstream blast valve which when opened will cause a blast of gas from within the live high-pressure tank through the pair of orifice means and through the downstream blast valve, and a metallic filter exhaust chamber disposed downstream of said blast valve and at least partially within said supporting insulating column for collecting substantially all of the arced gas and filtering the same prior to subsequent reuse.

4. A high-voltage compressed-gas circuit breaker including a live metallic tank filled with gas under pressure, a supporting insulating column for supporting said live metallic tank an adequate distance above ground, a pair of terminal bushings protruding into said live metallic tank and supporting relatively stationary contacts therein, movable bridging contact means for electrically bridging the pair of relatively stationary contacts in the closed circuit position, said movable bridging contact means including a substantially U-shaped conducting structure, insulating rod means extending through said supporting insulating column for actuating said U-shaped conducting structure, orifice means associated with each relatively stationary contact, means defining a downstream blast valve which when opened will cause a blast of gas from within the live high-pressure tank through the pair of orifice means and through the downstream blast valve, and a metallic filter exhaust chamber disposed downstream of said blast valve for collecting all of the arced gas and filtering the same prior to subsequent reuse.

5. A high-voltage compressed-gas circuit breaker including a live metallic tank filled with gas under pressure, a supporting insulating column for supporting said live metallic tank an adequate distance above ground, a pair of terminal bushings protruding into said live metallic tank and supporting relatively stationary contacts thereon, movable bridging contact means for electrically bridging the pair of relatively stationary contacts in the closed circuit position, said movable bridging contact means including a substantially U-shaped conducting structure, insulating rod means extending through said supporting insulating column for actuating said U-shaped conducting structure, a blast valve housing having a pair of orifice openings so that an orifice opening is associated with each relatively stationary contact, means defining a downstream blast valve associated with said valve housing, which when opened will cause a blast of gas from within the live high-pressure tank through the pair of orifice openings and through the downstream blast valve, and a metallic filter exhaust chamber disposed downstream of said blast valve for collecting substantially all of the arced gas and filtering the same prior to subsequent reuse.

6. A high-voltage compressed-gas circuit breaker including a live metallic tank filled with gas under pressure, a supporting insulating column for supporting said live metallic tank an adequate distance above ground potential, a pair of terminal bushings protruding into said lives metallic tank and supporting relatively stationary contacts therein, movable bridging contact means for electrically bridging the pair of relatively stationary contacts in the closed-circuit position, said movable bridging contact means including a substantially U-shaped conducting structure, insulating rod means extending through said supporting insulating column for actuating said U-shaped conducting structure a blast valve housing having a pair of orifice openings so that an orifice opening is associated with each relatively stationary contact, means defining a down-stream blast valve associated with said valve housing, which when opened will cause a blast of gas from within the live high-pressure tank through the pair of orifice openings and through the downstream blast valve, a metallic filter exhaust chamber disposed downstream of said blast valve for collecting all of the acred gas and purifying the same prior to subsequent reuse, and said metallic filter exhaust chamber being positioned between the rod portions of the substantially U-shaped conducting structure and at least partially within the upper end of said supporting insulating column.

7. A high-voltage compressed-gas circuit breaker including a live metallic tank filled with gas under pressure, an upstanding supporting insulating column for supporting said live metallic tank an adequate distance above ground potential, a pair of terminal bushings protruding laterally into said live metallic tank and supporting relatively stationary contact posts therein, movable bridging contact means for electrically bridging the pair of relatively stationary contact posts in the closed circuit position of the interrupter, said movable bridging contact means including a substantially U-shaped conducting structure comprising vertically extending conducting operating rods and a lower bridging conducting transverse connecting portion, said vertically extending conducting operating rods extending through the wall of said metallic tank, insulating rod means extending through said upstanding supporting insulating column for actuating said transverse conducting portion, sealing means disposed between each of the vertically extending conducting rod portions of the U-shaped bridging structure and the wall of the live metallic tank, a blast valve housing having a pair of orifice openings, an orifice opening associated with each relatively stationary contact post, means defining a downstream blast valve supported by said valve housing, which when opened will cause a blast of gas from within the live high-pressure tank through the pair of orifice openings and through the downstream blast valve, and a metallic filter exhaust chamber disposed downstream of said blast valve for collecting substantially all of the arced gas purifying the same prior to subsequent reuse.

References Cited by the Examiner

UNITED STATES PATENTS

| | | | |
|---|---|---|---|
| 2,108,560 | 2/38 | Kesselring | 200—148 |
| 2,125,525 | 8/38 | Thommen | 200—148 |
| 2,221,720 | 11/40 | Prince | 200—148 |
| 2,459,600 | 1/49 | Strom | 200—148 |
| 2,748,226 | 5/56 | MacNeill et al. | 240—148 |
| 2,757,261 | 7/56 | Lingal et al. | 200—148 |
| 2,824,937 | 2/58 | Strom | 200—148 |
| 2,955,182 | 10/60 | Caswell et al. | 200—148 |
| 2,979,591 | 4/61 | Friedrich | 200—150 |
| 3,009,042 | 11/61 | Schrameck et al. | 200—148 |

FOREIGN PATENTS

| | | |
|---|---|---|
| 874,045 | 4/42 | France. |
| 1,136,382 | 12/56 | France. |
| 1,222,392 | 1/60 | France. |
| 401,332 | 11/33 | Great Britain. |

KATHLEEN H. CLAFFY, *Primary Examiner.*

ROBERT K. SCHAEFER, BERNARD A. GILHEANY, *Examiners.*